(12) United States Patent
Honda

(10) Patent No.: US 11,215,956 B2
(45) Date of Patent: Jan. 4, 2022

(54) CONTENT OUTPUT APPARATUS AND CONTENT OUTPUT METHOD

(71) Applicant: HONDA MOTOR CO., LTD., Tokyo (JP)

(72) Inventor: Hiroshi Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/713,235

(22) Filed: Dec. 13, 2019

(65) Prior Publication Data

US 2020/0218209 A1    Jul. 9, 2020

(30) Foreign Application Priority Data

Jan. 9, 2019   (JP) .............................. JP2019-002086

(51) Int. Cl.
*G05B 15/02* (2006.01)
*G06F 3/16* (2006.01)
*G06F 3/14* (2006.01)

(52) U.S. Cl.
CPC .............. *G05B 15/02* (2013.01); *G06F 3/14* (2013.01); *G06F 3/165* (2013.01)

(58) Field of Classification Search
CPC . G05B 15/02; G06F 3/14; G06F 3/165; G06F 3/167; G06F 16/437; G06F 16/436; G09G 2320/0613; G09G 3/20; G09G 2354/00; B60W 50/14; B60W 2050/146
See application file for complete search history.

(56) References Cited

U.S. PATENT DOCUMENTS

| | | | |
|---|---|---|---|
| 10,091,554 B1* | 10/2018 | Newell | A61B 5/163 |
| 10,303,411 B2* | 5/2019 | Chang | G06F 3/126 |
| 10,725,556 B2* | 7/2020 | Joo | G06F 3/017 |
| 10,821,850 B2* | 11/2020 | Penilla | G06F 3/0482 |
| 2005/0163481 A1* | 7/2005 | Hirai | G11B 27/329 386/248 |
| 2009/0210899 A1* | 8/2009 | Lawrence-Apfelbaum | H04N 21/4334 725/34 |
| 2012/0330869 A1* | 12/2012 | Durham | G06N 5/022 706/16 |
| 2013/0041747 A1* | 2/2013 | Anderson | H04N 21/8549 705/14.39 |

(Continued)

FOREIGN PATENT DOCUMENTS

JP    2014-180912 A    9/2014

*Primary Examiner* — Ramesh B Patel
(74) *Attorney, Agent, or Firm* — Thomas | Horstemeyer, LLP

(57) ABSTRACT

A content output apparatus includes a management unit configured to manage preference information relating to a preference regarding content and mode information relating to an output mode of content, a content decision unit configured to decide content to be output, based on the preference information or independently of the preference information, a mode decision unit configured to decide an output mode of the decided content based on the mode information, an output unit configured to output the decided content, in the decided output mode, and an acquisition unit configured to acquire a reaction of a user to the output content. The management unit changes the mode information, if the reaction of the user is negative and the output content is content decided independently of the preference information.

9 Claims, 3 Drawing Sheets

(56) References Cited

U.S. PATENT DOCUMENTS

| | | | | |
|---|---|---|---|---|
| 2014/0269441 | A1* | 9/2014 | Hyde | H04L 67/18 |
| | | | | 370/259 |
| 2018/0279004 | A1* | 9/2018 | Takahashi | H04N 21/4668 |
| 2018/0279006 | A1* | 9/2018 | Cole | H04N 19/39 |
| 2019/0108858 | A1* | 4/2019 | Gewickey | G11B 27/11 |
| 2019/0174190 | A1* | 6/2019 | Newell | H04N 21/8405 |
| 2019/0354552 | A1* | 11/2019 | Maharajh | G06Q 30/0277 |
| 2020/0013402 | A1* | 1/2020 | Kawano | G06F 3/013 |
| 2020/0320112 | A1* | 10/2020 | Bansal | G06N 3/08 |

* cited by examiner

108

| USER ID | MUSIC GENRE | FOOD GENRE | MOVIE GENRE | ... |
|---|---|---|---|---|
| 001 | CLASSICAL | WESTERN FOOD | SUSPENSE | ... |
| 002 | ROCK | JAPANESE FOOD | ANIMATION | ... |
| ... | ... | ... | ... | ... |

109

| USER ID | VOLUME LEVEL | READING SPEED | PAUSE | OUTPUT TIMING | ... |
|---|---|---|---|---|---|
| 001 | ... | ... | ... | ... | ... |
| 002 | ... | ... | ... | ... | ... |
| ... | ... | ... | ... | ... | ... |

FIG. 2

CONTENT OUTPUT APPARATUS AND CONTENT OUTPUT METHOD

CROSS-REFERENCE TO RELATED APPLICATION(S)

This application claims priority to and the benefit of Japanese Patent Application No. 2019-002086 filed on Jan. 9, 2019, the entire disclosure of which is incorporated herein by reference.

BACKGROUND OF THE INVENTION

Field of the Invention

The present invention relates to a content output apparatus and a content output method.

Description of the Related Art

Apparatuses such as in-vehicle apparatuses and mobile apparatuses provide a variety of information to users. Japanese Patent Laid-Open No. 2014-180912 describes changing the information provision conditions, when providing information to a user, according to the reaction of the user.

SUMMARY OF THE INVENTION

Apparatuses that output content to users may output content decided in line with the preferences of users. In such cases, a user could possibly have dissatisfaction with content, even if the content provision conditions are changed according to the reaction of the user. An aspect of the present invention is to provide a technology for performing optimal output of content to a user.

Some embodiments of the present invention provide a content output apparatus comprising: a management unit configured to manage preference information relating to a preference regarding content and mode information relating to an output mode of content; a content decision unit configured to decide content to be output, based on the preference information or independently of the preference information; a mode decision unit configured to decide an output mode of the decided content based on the mode information; an output unit configured to output the decided content, in the decided output mode; and an acquisition unit configured to acquire a reaction of a user to the output content, wherein the management unit changes the mode information, if the reaction of the user is negative and the output content is content decided independently of the preference information.

BRIEF DESCRIPTION OF THE DRAWINGS

FIG. 2 is a diagram illustrating an example of preference information and mode information according to the embodiment.

DESCRIPTION OF THE EMBODIMENTS

Figure 1:
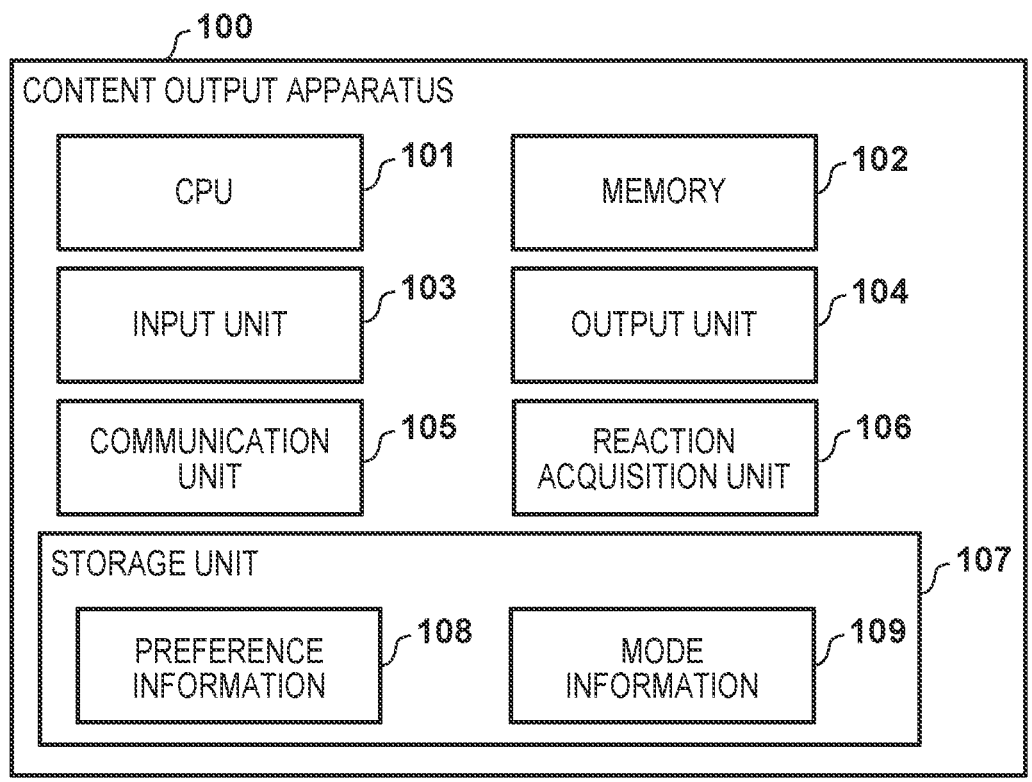
FIG. 1 is a block diagram illustrating an example configuration of a content output apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

The configuration of a content output apparatus 100 according to some embodiments of the present invention will be described, with reference to the block diagram of FIG. 1. The content output apparatus 100 outputs content to users. Content includes, for example, music, video, news, reminders, information on restaurants, incoming message notifications, incoming call notifications, and the like. The content output apparatus 100 includes, for example, a personal computer, a workstation, a smartphone, a tablet device, a smart speaker, an in-vehicle apparatus (e.g., car navigation system), and the like. The content output apparatus 100 has the constituent elements shown in FIG. 1.

A processor 101 controls the overall operations of the content output apparatus 100. The processor 101 functions as a CPU (central processing unit), for example. A memory 102 stores programs, temporary data and the like that are used in operations of the content output apparatus 100. The memory 102 is realized by a ROM (read only memory) or a RAM (random access memory), for example. An input unit 103 is used in order for a user of the content output apparatus 100 to perform input to the content output apparatus 100, and is, for example, realized by input devices such as a mouse, a keyboard and buttons. An output unit 104 is used for outputting content to a user from the content output apparatus 100, and is, for example, realized by a display device (display) or an audio device (speaker). A communication unit 105 provides a function for the content output apparatus 100 to communicate with other apparatuses, and is, for example, realized by a network card, an antenna, or the like. Communication with other apparatuses may be wired or may be wireless. A reaction acquisition unit 106 is used in order to acquire the reaction of users, and is, for example, realized by a sensor such as a camera or a microphone. Some devices such as a microphone may be used for both the input unit 103 and the reaction acquisition unit 106.

A storage unit 107 stores data that is used in operations of the content output apparatus 100, such as preference information 108 and mode information 109, for example, and manages this information. The storage unit 107 is realized by a storage device such as a disk drive (e.g., HDD (hard disk drive) or SDD (solid state drive)). In this embodiment, the preference information 108 and the mode information 109 are stored in the content output apparatus 100. Alternatively, some or all of this information may be stored in an apparatus (external storage device) that is different from the content output apparatus 100. In this case, the content output apparatus 100 receives the preference information 108 and the mode information 109 from the other apparatus, using the communication unit 105. The preference information 108 and the mode information 109 may be stored in a file format, or may be stored in a database or another format.

An example of the preference information 108 and the mode information 109 will now be described, with reference to FIG. 2. The preference information 108 is information relating to preferences regarding content. Preferences regarding content may be defined for a variety of content. For example, the preference information 108 includes a music genre, a food genre, a movie genre, and the like.

Furthermore, with regard to the individual genres, preferences may be defined in detail such as individual pieces of music.

The mode information 109 is information relating to an output mode of content. The output mode may be defined for a variety of outputs. For example, the mode information 109 includes volume level, reading speed, pause, output timing, display luminance, candidate display number, character size and the like when outputting content. Furthermore, the output mode may be defined for every content that is output. For example, volume in the case of outputting music and volume in the case of outputting an incoming message notification may be defined separately.

Also, in the case where the content output apparatus 100 is an apparatus that is shared by a plurality of users (family members) such as a smart speaker, the preference information 108 and the mode information 109 may be managed per user. In the example of FIG. 2, users are identified by user ID. Also, in the case where the content output apparatus 100 is an apparatus possessed by an individual user such as a smartphone, the preference information 108 and the mode information 109 need not be managed per user.

Figure 3:
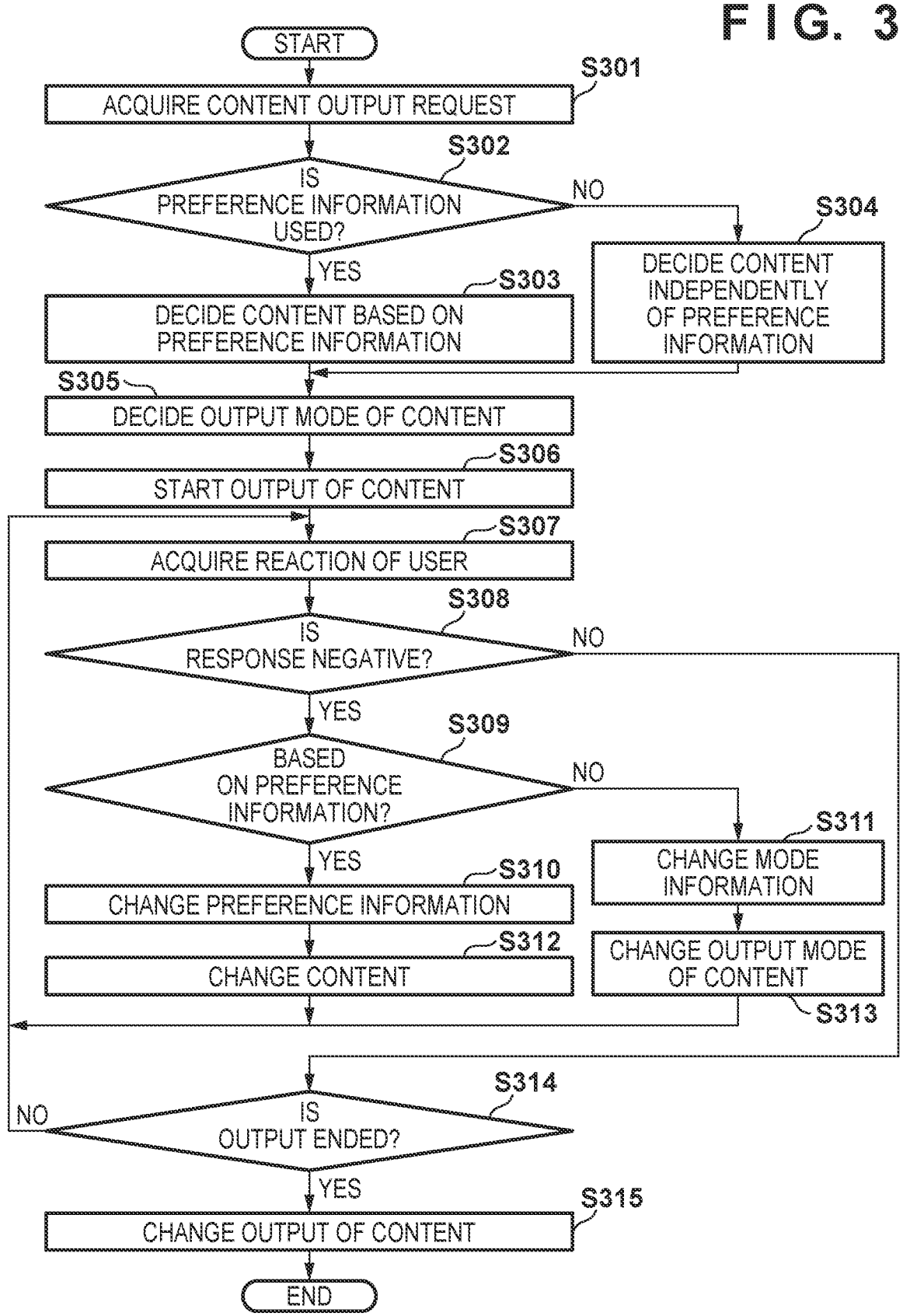
FIG. 3 is a flowchart illustrating example operations of the content output apparatus according to the embodiment.

Example operations of the content output apparatus 100 will now be described, with reference to the flowchart of FIG. 3. With the content output method that is executed by the content output apparatus 100, content is output to a user, and the preference information 108 and the mode information 109 are changed based on the reaction of the user. The steps of the method illustrated in FIG. 3 are implemented by the processor 101 executing a program stored in the memory 102, for example. Alternatively, some or all of the steps of this method may be realized by hardware such as an application specific integrated circuit (ASIC (application specific integrated circuit). At the point of starting the operations of FIG. 3, the preference information 108 and the mode information 109 have default settings or settings changed by the content output method when previously executed.

In step S301, the processor 101 acquires a content output request. The content output request may be acquired from a user through the input unit 103, or may be acquired from another process of the content output apparatus 100 (e.g., incoming message notification from another apparatus, etc.).

In step S302, the processor 101 determines whether to use the preference information 108 in order to decide the content to be output. In the case of using the preference information 108 (YES in step S302), the processor 101 transitions the processing to step S303, and in the other case (NO in step S302), the processor 101 transitions the processing to step S304. For example, in the case where the user merely requests the output of music, and specific content is not designated in step S301, the processor 101 determines to use the preference information 108. On the other hand, in the case where the user requests the output of a specific piece of music in step S301, the processor 101 determines not to use the preference information 108. The processor 101 also determines not to use the preference information 108 in the case where content to be output is decided beforehand, such as in the case of an incoming message notification.

In step S303, the processor 101 decides content to be output, based on the preference information 108. For example, in the case where output of music is requested, and the user who is using the content output apparatus 100 has the user ID "001", the processor 101 decides on a piece of music in the "classical" genre. The specific piece of music may be decided randomly or through reviews by other people.

In step S304, the processor 101 decides content to be output, independently of the preference information 108. For example, the processor 101 may decide on content designated by the user or content that is decided beforehand by the content output apparatus 100 as content to be output.

In step S305, the processor 101 decides the output mode of the content decided in step S303 or S304, based on the mode information 109. For example, if the decided content is music, the processor 101 decides the volume level. Also, if the decided content is news, the processor 101 decides the speed at which the news is read out and pause.

In step S306, the processor 101 starts output of the content decided in step S303 or S304, in the output mode decided in step S305. The content may be content that is stored in the storage unit 107 of the content output apparatus 100, or may be content received from another apparatus through the communication unit 105.

In step S307, the processor 101 acquires the reaction of the user to the content output in step S306. For example, the processor 101 acquires the facial expression of the user or remarks by the user, using the reaction acquisition unit 106.

In step S308, the processor 101 determines whether the response by the user acquired in step S307 is negative. If the reaction of the user is negative (YES in step S308), the processor 101 transitions the processing to step S309, and if not (NO in step S308), the processor 101 transitions the processing to step S314. For example, the processor 101 determines that the reaction of the user is negative, in the case where the user is frowning or makes a negative remark.

In step S309, the processor 101 determines whether the content output in step S306 is content decided based on the preference information 108. If the output content is content decided based on the preference information 108 (YES in step S309), the processor 101 transitions the processing to step S310, and if not (NO in step S309), the processor 101 transitions the processing to step S311.

In step S310, the processor 101 changes the preference information stored in the storage unit 107. For example, the processor 101 changes an item related to the current output, among the preference information 108. Specifically, if the reaction of the user is negative when "classical" music is output, the processor 101 changes the music genre to "rock". The changed setting may be selected randomly. Also, the processor 101 may record past histories and not reuse settings used in the past.

In step S311, the processor 101 changes the mode information 109 stored in the storage unit 107. For example, the processor 101 changes an item related to the current output, among the mode information 109. Specifically, in the case where a piece of music designated by the user is output and the reaction of the user is negative, the processor 101 changes the volume level. The changed setting may be randomly selected. Also, the processor 101 may record past histories and not reuse settings used in the past. In the case where there are a plurality of items related to the current output, the processor 101 may randomly select one item. Also, the processor 101 may record past histories and change items that have not been changed.

In step S312, the processor 101 changes the content currently being output, based on the preference information 108 after the change. Thereafter, the processor 101 returns to step S307, and further acquires the reaction of the user.

In step S313, the processor 101 changes the output mode of the content currently being output, based on the mode information 109 after the change. Thereafter, the processor 101 returns to step S307, and further acquires the reaction of the user.

In step S314, the processor 101 determines whether to end the output of content. In the case of ending the output of content (YES in step S314), the processor 101 transitions the processing to step S315, and if not (NO in step S314), the processor 101 transitions the processing to step S307. For example, the processor 101 determines to end the output of content, if the content has been output to the end or if the user requests to stop output. In step S315, the processor 101 ends the output of content.

In the case where the user reacts negatively to content decided independently of the preference information 108, there is conceivably dissatisfaction with the output mode of the content. In view of this, as mentioned above, the processor 101 updates the mode information 109 in step S311. On the other hand, in the case where the user reacts negatively to content decided based on the preference information 108, there may be dissatisfaction with the content itself or there may be dissatisfaction with the output mode of the content. The output mode is changed in the case where the content was decided independently of the preference information 108, improving accuracy, and thus, in the abovementioned method, the processor 101 updates the preference information 108. In this way, according to the abovementioned method, the preference information 108 and the mode information 109 are updated based on the reaction of the user, thus enabling optimal output of content to be performed with respect to users, through repetition of this method.

SUMMARY OF EMBODIMENT

Configuration 1

A content output apparatus (100) including:

a management unit configured to manage preference information (108) relating to a preference regarding content and mode information (109) relating to an output mode of content;

a content decision unit configured to decide content to be output, based on the preference information or independently of the preference information;

a mode decision unit configured to decide an output mode of the decided content based on the mode information;

an output unit configured to output the decided content, in the decided output mode; and an acquisition unit configured to acquire a reaction of a user to the output content, the management unit changing the mode information, if the reaction of the user is negative and the output content is content decided independently of the preference information.

According to this configuration, optimal output of content can be performed with respect to users.

Configuration 2

The content output apparatus according to item 1, in which the management unit changes the preference information, if the reaction of the user is negative and the output content is content decided based on the preference information.

According to this configuration, more optimal output of content can be performed with respect to users.

Configuration 3

The content output apparatus according to item 1 or 2, in which the management unit manages the preference information and the output mode per user.

According to this configuration, optimal output of content can be performed for each individual user.

Configuration 4

A content output method including:

deciding content to be output, based on preference information (108) relating to a preference regarding content or independently of the preference information;

deciding an output mode of the decided content based on mode information (109) relating to an output mode of content;

outputting the decided content, in the decided output mode; and acquiring a reaction of a user to the output content, the mode information being changed, if the reaction of the user is negative and the output content is content decided independently of the preference information.

According to this configuration, optimal output of content can be performed with respect to users.

Configuration 5

A program for causing a computer to function as units of the content output apparatus according to any one of the items 1 to 3.

According to this configuration, the invention is provided in the form of a program.

The invention is not limited to the foregoing embodiments, and various variations/changes are possible within the spirit of the invention.

What is claimed is:

1. A content output apparatus comprising:
   one or more processors;
   memory;
   a storage device storing preference information relating to a preference regarding content, and mode information specifying a way of outputting content; and
   one or more programs, wherein the one or more programs are stored in the memory and configured to be executed by the one or more processors, the one or more programs including instructions for:
   acquiring a request to output content;
   deciding content based on the request and the preference information stored in the storage device in a case where the request does not designate specific content, and content based on the request and independently of the preference information stored in the storage device in a case where the request designates specific content;
   outputting the decided content through at least one of a speaker or a display to a user in the way specified by the mode information stored in the storage device;
   determining whether a reaction of the user to the decided content which has been output to the user is negative by analyzing behavior of the user obtained using at least one of a camera or a microphone; and
   changing the mode information stored in the storage device, in a case where the reaction of the user is negative and the decided content which has been output to the user was decided independently of the preference information.

2. The content output apparatus according to claim 1, wherein the one or more programs further include instructions for:
   changing the preference information in a case where the reaction of the user is negative and the decided content which has been output to the user was decided based on the preference information.

3. The content output apparatus according to claim 1, wherein
the storage device stores the preference information and the output mode per user.

4. The content output apparatus according to claim 1, wherein the preference information includes at least one of a music genre, a food genre, or a movie genre.

5. The content output apparatus according to claim 1, wherein the mode information includes at least one of volume level, reading speed, pause, output timing, display luminance, candidate display number, or character size when outputting content.

6. The content output apparatus according to claim 1, wherein the one or more programs further includes instructions for acquiring a content output request from the user through an input device.

7. The content output apparatus according to claim 1, wherein deciding content includes:
  deciding content based on the preference information in a case where a content output request acquired from the user designates only a type of content; and
  deciding content independently of the preference information in a case where a content output request acquired from the user designates specific content.

8. A content output method comprising:
  storing, in a storage device, preference information relating to a preference regarding content, and mode information specifying a way of outputting content;
  acquiring a request to output content;
  deciding content based on the request and the preference information stored in the storage device in a case where the request does not designate specific content, and content based on the request and independently of the preference information stored in the storage device in a case where the request designates specific content;
  outputting the decided content through at least one of a speaker or a display to a user in the way specified by the mode information stored in the storage device;
  determining whether a reaction of the user to the decided content which has been output to the user is negative by analyzing behavior of the user obtained using at least one of a camera or a microphone; and
  changing the mode information stored in the storage device in a case where the reaction of the user is negative and the decided content which has been output to the user was decided independently of the preference information.

9. A non-transitory storage medium storing one or more programs including instructions for:
  storing, in a storage device, preference information relating to a preference regarding content, and mode information specifying a way of outputting content;
  acquiring a request to output content;
  deciding content based on the request and the preference information stored in the storage device in a case where the request does not designate specific content, and content based on the request and independently of the preference information stored in the storage device in a case where the request designates specific content;
  outputting the decided content through at least one of a speaker or a display to a user in the way specified by the mode information stored in the storage device;
  determining whether a reaction of the user to the decided content which has been output to the user is negative by analyzing behavior of the user obtained using at least one of a camera or a microphone; and
  changing the mode information stored in the storage device in a case where the reaction of the user is negative and the decided content which has been output to the user was decided independently of the preference information.

* * * * *